(12) United States Patent
Tan et al.

(10) Patent No.: US 12,483,930 B2
(45) Date of Patent: Nov. 25, 2025

(54) BINARY VARIATIONAL (BIV) CSI CODING

(71) Applicant: Nokia Technologies Oy, Espoo (FI)

(72) Inventors: Jun Tan, Glenview, IL (US); Jie Chen, Naperville, IL (US)

(73) Assignee: Nokia Technologies Oy, Espoo (FI)

(*) Notice: Subject to any disclaimer, the term of this patent is extended or adjusted under 35 U.S.C. 154(b) by 606 days.

(21) Appl. No.: 17/732,343

(22) Filed: Apr. 28, 2022

(65) Prior Publication Data

US 2023/0354096 A1    Nov. 2, 2023

(51) Int. Cl.
*H04W 28/06* (2009.01)
*H04B 7/06* (2006.01)
*G06N 3/0455* (2023.01)
*G06N 3/0475* (2023.01)

(52) U.S. Cl.
CPC .......... *H04W 28/06* (2013.01); *H04B 7/0626* (2013.01); *G06N 3/0455* (2023.01); *G06N 3/0475* (2023.01)

(58) Field of Classification Search
CPC ... H04W 28/06; H04B 7/0626; H04B 7/0413; H04B 7/0486; H04B 3/047; H04B 3/0455; G06N 3/047; G06N 3/0455; G06N 3/0475
USPC ......................................................... 370/329
See application file for complete search history.

(56) References Cited

U.S. PATENT DOCUMENTS

| | | | |
|---|---|---|---|
| 2020/0090069 A1* | 3/2020 | Mandt | G06N 3/08 |
| 2020/0220605 A1* | 7/2020 | Xu | H04B 7/0626 |
| 2021/0273706 A1* | 9/2021 | Zeng | H04B 7/0486 |
| 2021/0273707 A1* | 9/2021 | Yoo | H04L 1/0041 |
| 2022/0060235 A1* | 2/2022 | Namgoong | G06N 3/047 |
| 2023/0079744 A1* | 3/2023 | Cavatassi | H04L 1/0014 706/21 |
| 2024/0413860 A1* | 12/2024 | Dikme | H04B 7/0413 |

OTHER PUBLICATIONS

3rd Generation Partnership Project; Technical Specification Group Radio Access Network; NR; Physical layer procedures for data (Release 17), 230 pages, 3GPP TS.38.214 v17.4.0.

(Continued)

*Primary Examiner* — Jungwon Chang
(74) *Attorney, Agent, or Firm* — Duft & Bornsen, PC

(57) ABSTRACT

In some example embodiments, there may be provided a method that includes receiving, by a machine learning encoder as part of a training phase, channel state information as data samples; generating, by the machine learning encoder, a latent variable comprising a log likelihood ratio value representation for the channel state information, wherein the latent variable provides a lower dimension binary representation when compared to the received channel state information to enable compression of the received channel state information; generating, by the binary sampler, a binary coding value representation of the latent variable, wherein the binary coding value converts the latent variable to a binary form; and generating, by the machine learning decoder, a reconstructed channel state information, wherein the generating is based in part on the binary coding value representation of the latent variable generated by the binary sampler. Related systems, methods, and articles of manufacture are also disclosed.

19 Claims, 9 Drawing Sheets

(56) References Cited

OTHER PUBLICATIONS

3rd Generation Partnership Project; Apple (Moderator); "email discussion on other aspects of AI/ML for CSI enhancement," 3GPP TSG RAN WG1 Meeting #109e, Electronic Meeting, R1-220xxxx, May 2022, 21 pages.

Kingma, D. P. et al., "Auto-encoding variational bayes." arXiv preprint arXiv:1312.6114 (2013).

Qualcomm "New SI: Study on Artificial Intelligence (AI)/Machine Learning (ML) for NR Air Interface," 3GPP TSG RAN Meeting #94e, Electronic Meeting, RP-213599, Dec. 16-17, 2021, 6 pages.

Van den Oord, A. et al., "Neural discrete representation learning." Advances in neural information processing systems 30 (2017).

Wen, C.-K. et al., "Deep Learning for Massive MIMO CSI Feedback." arXiv e-prints (2017): arXiv-1712.

* cited by examiner

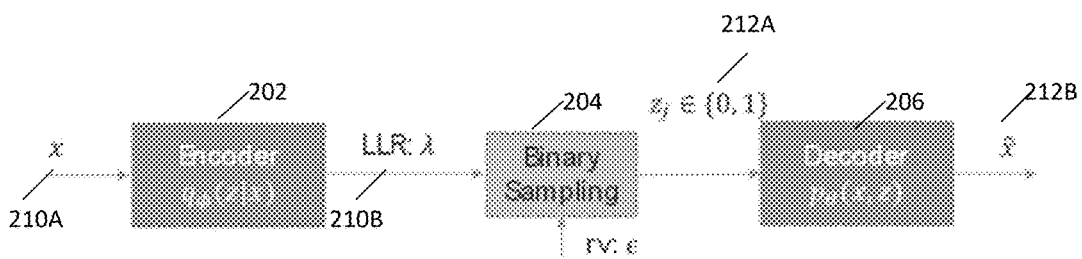

$$\tilde{L}_{\theta,\phi}(\mathbf{x}) = \log p_\theta(\mathbf{x}|\mathbf{z}) + \log p_\theta(\mathbf{z}) - \log q_\phi(\mathbf{z}|\mathbf{x})$$

Objective Function, the parameter ø is used to indicate the parameterized encoder, and θ indicates the parameterized decoder.

Decoder portion of objective function corresponding to a posterior probability

Portion of loss function corresponding to a priori probability of the binary latent variable Z of binary sampling Encoder portion of objective function corresponding to a variational probability

FIG. 2

712 — Provide, to a trained machine learning encoder comprised at a user equipment, channel state information, wherein user equipment further comprises a binary sampler

714 — Generate, by the binary data sampler, a binary coding value representation the channel state information, wherein the binary data sampler converts a latent variable representation of the channel state information into the binary coding value to provide compression to the channel state information before transmission via a feedback channel

716 — Send, by the user equipment, a measurement report to a base station, wherein the measurement report includes the binary coding value representation of the channel state information to enable the base station to decode, using a machine language decoder, the representation in order to reconstruct the channel state information

Receive, by a trained machine language decoder, a measurement report provided by a user equipment, wherein the measurement report includes a binary coding value representation of a channel state information

724

Generate, by the machine learning decoder, a reconstructed channel state information, wherein the generating is based in part on the binary coding value representation.

FIG. 7C

BINARY VARIATIONAL (BIV) CSI CODING

FIELD

The subject matter described herein relates to wireless communications.

BACKGROUND

With the $5^{th}$ generation (5G) of mobile communication, the network is being driven with respect to latency, throughput, and spectral efficiency. With the advent of the $6^{th}$ generation (6G) and beyond, the network may be pushed even further, so there is a need to facilitate gains in network performance.

SUMMARY

In some example embodiments, there may be provided a method that includes receiving, by a machine learning encoder as part of a training phase, channel state information as data samples, wherein the machine learning encoder is comprised in the machine learning based channel state information coding system, which further comprises a binary sampler and a machine learning decoder; generating, by the machine learning encoder, a latent variable comprising a log likelihood ratio value representation for the channel state information, wherein the latent variable provides a lower dimension binary representation when compared to the received channel state information to enable compression of the received channel state information; generating, by the binary sampler, a binary coding value representation of the latent variable, wherein the binary coding value converts the latent variable to a binary form; and generating, by the machine learning decoder, a reconstructed channel state information, wherein the generating is based in part on the binary coding value representation of the latent variable generated by the binary sampler.

In some variations, one or more of the features disclosed herein including the following features can optionally be included in any feasible combination. The method may further include training, using an objective function, the machine learning encoder and the machine learning decoder, wherein the objective function includes a variational probability for the machine learning encoder, a posteriori probability for the machine learning decoder, and a priori probability of the binary latent variable. The objective function comprises a sum of the posteriori probability for the machine learning decoder and the priori probability of the binary latent variable less the variational probability for the machine learning encoder. The training uses backpropagation and the objective function to determine one or more weights of the machine learning encoder and the machine learning decoder, and wherein the objective function uses at least one input comprising the binary coding value representation of the latent variable. The machine learning encoder and the machine learning decoder are comprised in a variational auto encoder trained with the objective function. The objective function may be represented by the following equation:

$$\tilde{L}_{\theta,\phi}(x) = \log p_\theta(x|z) + \log p_\theta(z) - \log q_\phi(z|x),$$

wherein $\phi$ indicates the machine learning encoder, $\theta$ indicates the machine learning decoder, $\tilde{L}_{\theta,\phi}(x)$ represents the objective function, $p_\theta(x|z)$ is a posteriori probability for the machine learning decoder, $q_\phi(z|x)$ is a variational probability for the machine learning encoder, and $p_\theta(z)$ is a priori probability of the binary latent variable associated with the data sampler output. The binary sampler converts the log likelihood ratio value comprised as a log likelihood ratio vector into the binary coding values comprised as a binary coding vector, wherein for each dimension of a log likelihood ratio vector, a log likelihood ratio, which is at an output of the machine learning encoder, is added along with an added noisy random variable as a Gaussian random variable with zero mean and a fixed variance. The binary sampler receives as an input a log likelihood ratio vector $\lambda$ provided by the machine learning encoder and converts the log likelihood ratio vector $\lambda$ into the binary coding value representation of the latent variable. The binary sampler converts the log likelihood ratio vector $\lambda$ into the binary coding value representation of the latent variable based on the following:

$$z = \text{sgn}(\lambda + \sigma\epsilon),$$

wherein z is a vector including the binary coding value, $\lambda$ is the log-likelihood ratio value vector, $\sigma$ is a constant, $\epsilon$ is an independent gaussian random variable, and sgn is a sign function. A log priori probability of the binary latent variable is calculated based on a binomial distribution of a sum of the binary latent variable over its dimensions.

In some example embodiments, there may be provided a method that includes providing, to a trained machine learning encoder comprised at a user equipment, channel state information, wherein user equipment further comprises a binary sampler; generating, by the binary sampler, a binary coding value representation the channel state information, wherein the binary sampler converts a latent variable representation of the channel state information into the binary coding value to provide compression to the channel state information before transmission via a feedback channel; sending, by the user equipment, a measurement report to a base station, wherein the measurement report includes the binary coding value representation of the channel state information to enable the base station to decode, using a machine learning decoder, the representation in order to reconstruct the channel state information.

In some variations, one or more of the features disclosed herein including the following features can optionally be included in any feasible combination. The base station includes a trained machine learning decoder, wherein the trained machine learning decoder is comprised in the machine learning based channel state information coding system. The trained machine learning encoder and the trained machine learning decoder are trained using an objective function, wherein the objective function includes a variational probability for the machine learning encoder, a posteriori probability for the machine learning decoder, and a priori probability of the binary latent variable. The objective function comprises a sum of the posteriori probability for the machine learning decoder and the priori probability of the binary latent variable less the variational probability for the machine learning encoder. The trained machine learning encoder and the trained machine learning decoder are trained using backpropagation and the objective function to determine one or more weights of the machine learning encoder and the machine learning decoder, and wherein the objective function uses at least one input comprising the binary coding value representation of the latent variable. The machine learning encoder and the machine learning decoder are comprised in a variational auto encoder trained with the objective function. The machine learning encoder is comprised in an artificial intelligence engine at the user equipment. The objective function may be represented by the following equation:

$$\tilde{L}_{\theta,\phi}(x) = \log p_\theta(x|z) + \log p_\theta(z) - \log q_\phi(z|x),$$

wherein $\phi$ indicates the machine learning encoder, $\theta$ indicates the machine learning decoder, $\tilde{L}_{\theta,\phi}(x)$ represents the objective function, $p_\theta(x|z)$ is a posteriori probability for the machine learning decoder, $q_\phi(z|x)$ is a variational probability for the machine learning encoder, and $p_\theta(z)$ is a priori probability of the binary latent variable associated with the data sampler output.

In some example embodiments, there may be provided a method that includes receiving, by a trained machine learning decoder, a measurement report provided by a user equipment, wherein the measurement report includes a binary coding value representation of a channel state information; and generating, by the machine learning decoder, a reconstructed channel state information, wherein the generating is based in part on the binary coding value representation.

In some variations, one or more of the features disclosed herein including the following features can optionally be included in any feasible combination. The machine learning decoder is comprised in a base station.

The trained machine learning decoder is trained using an objective function, wherein the objective function includes a variational probability for a machine learning encoder, a posteriori probability for the machine learning decoder, and a priori probability of a binary latent variable. The objective function comprises a sum of the posteriori probability for the machine learning decoder and the priori probability of the binary latent variable less the variational probability for the machine learning encoder.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIG. 2 depicts an example of a ML model based coding system, in accordance with some example embodiments;

FIGS. 7A, 7B, and 7C depict examples of processes for a neural network encoder and a neural network decoder for CSI feedback, in accordance with some example embodiments, in accordance with some example embodiments.

Figure 1:
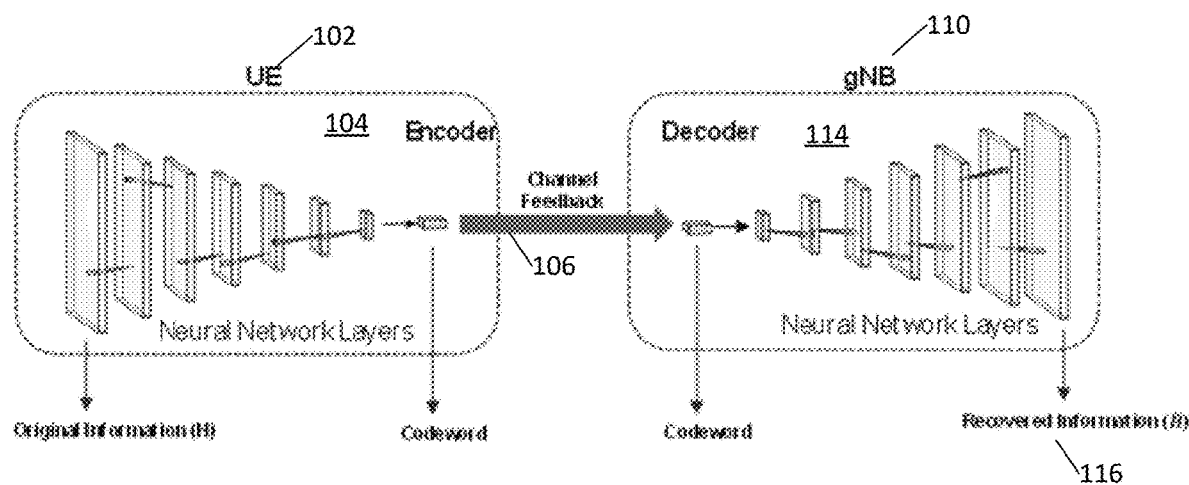
FIG. 1 depicts an example of a neural network encoder and a neural network decoder for CSI feedback, in accordance with some example embodiments.

Like labels are used to refer to same or similar items in the drawings.

DETAILED DESCRIPTION

For a wireless network, the use of channel state information (CSI) acquisition and feedback may be considered a step in closed-loop multiple input multiple output (MIMO) operation. In this loop, the base station, such as the gNB, may obtain CSI specific to the user equipment (UE), and the gNB may then be able to determine (using UE-specific CSI feedback) downlink transmission parameters. However, recent progress in artificial intelligence (AI) and/or machine learning (ML), such as neural network technology, may enable the use of AI/ML (e.g., neural network engines or other types of AI or ML engines) technology for the CSI feedback. For example, an ML model, such as an auto encoder (AE), variational auto encoder (VAE), or other type of machine learning or artificial intelligence technology, may be used for compression at the UE of the CSI feedback, and an ML model may be used for decompression of the CI feedback at the network, such as by the gNB base station. The phrase "ML model" refers to a ma chine learning engine or artificial intelligence engine, which is trained using data. In 3GPP for example, RP-213599, Study on Artificial Intelligence (AI)/Machine Learning (ML) for NR Air Interface, Dec. 6-17, 2021, relates to a study of the utilization of AI/ML approach for the air-interface, and the CSI feedback enhancement may be considered a use case in that study.

A problem, however, for CSI feedback using AI/ML technology relates to quantization. Specifically, the CSI feedback (which is sent from UE to gNB) may be digitalized into bits to fit into a feedback channel. In the case of the auto encoder type machine learning model for example, the CSI compression provided by the auto encoder may need a subsequent quantization step, but the quantization may introduce quantization errors.

In some example embodiments, there is provided anew design that uses a ML model to compress and/or decompress CSI feedback, such that a separate quantization step for the CSI feedback is not needed. In accordance with some example embodiments, the ML model may comprise a new design or configuration referred to herein as binary variational CSI coding or biv-CSI coding, for short. The biv-CSI coding is based in part on a neural network, such as a variational auto-encoder (VAE), although other types of neural networks may be used as well. Moreover, the biv-CSI coding assumes the use of a binary latent variable to address the binary representation problem that may be considered unique for the CSI feedback problem.

Before providing additional description regarding the ML encoders and decoders disclosed herein, the following provides some additional context regarding CSI measurement and reporting as well as machine learning models used in encoders and decoders.

In 5G (or NR), the CSI acquisition framework (see, e.g., 3GPP TS 38.214) is relatively flexible with related reference signals and procedures. The basic NR CSI procedure follows the following process. First, the gNB configures one or more UEs in the network using CSI reporting configurations, so that the UE(s) can monitor the downlink channel state information-reference signals (CSI-RS). The CSI-RS may be configured (based on downlink channel indicator, DCI, triggering) for periodic, semi-persistent, or aperiodic transmission. Following the gNB's configuration, the UE may measure the downlink channel carrying the downlink CSI-RS, for example. The UE may then report the CSI parameters to gNB as CSI feedback in the uplink feedback channel. The CSI feedback may include several parameters, such as channel quality indicator (CQI), precoding matrix indicators (PMI), rank indicator (RI), and/or other indicator of the state or quality of the channel. When the gNB receives the CSI feedback from the UE, the gNB may then configure downlink data transmission parameters, such as modulation scheme, code rate, number of transmission layers or beams, MIMO precoding matrices, and the like accordingly.

The CSI feedback process is a part of the overall MIMO operation in NR (or 5G). The CSI feedback allows the UE to send CSI feedback to the network and, in particular, the gNB, for example. With this CSI feedback, the gNB can determine, for example, its precoder for downlink (DL) MIMO transmission to a specific UE. The CSI feedback performance may depend on the quality of the feedback information provided to the gNB and/or the overhead in the feedback transmission channel. And, the use of AI/ML technology may enable solutions for this general CSI feedback problem. As noted, 3GPP has a study item, RP-213599, for AI/ML, where an AI/ML use case is CSI feedback enhancement such as overhead reduction, improved accuracy, and prediction.

As noted above, an application of AI/ML technology is to use auto encoder technology to compress the CSI feedback. When this is the case, the UE will have an encoder implemented with a ML model, such as a neural network, and the gNB will have a decoder also implemented with a ML model, such as a neural network. The UE may use the encoder to generate a compressed output for the channel state information feedback. As part of the noted closed loop feedback, this channel feedback is sent to gNB, which uses the decoder to decompress and thus recover the CSI, such as CSI channel gain (or, e.g., channel characteristics or state). Neural networks usually operate (or process) real numbers, and the channel feedback (as the output of the encoder) may be in the form of real numbers, but may need, as noted, a quantization step to fit these numbers into a feedback channel. In other words, an extra quantization step may be needed after the UE's encoder but this extra quantization will likely introduce quantization errors that impacts performance.

FIG. 1 depicts an example of neural network based coding system for CSI feedback, in accordance with some example embodiments. In the example of FIG. 1, neural networks are implemented as auto encoders, although other types of ML models may be used as well to provide the compression and decompression.

At the example of FIG. 1, the UE 102 includes an encoder 104 comprising a neural network, which may include one or more layers (or blocks). The base station, such as a gNB 110, may include a decoder 114 comprising another neural network, which may include one or more layers (or blocks). The output 106 of the UE's encoder includes the channel state information (CSI) feedback. The gNB may receive (via an uplink feedback channel) the channel state information feedback. And, the gNB may use the received channel feedback as an input to the decoder 114. The output 116 of the decoder is the re-constructed CSI, such as the channel state or gain. As noted however, a problem (which is addressed at least in part herein) is the quantization problem. Specifically, the output of the encoder (which is CSI feedback) may need to be quantized before the channel feedback can be sent to gNB. As the outputs of the encoder are real type numbers, an extra quantization may be used to digitize the CSI feedback. And although high-resolution quantization may be used to ensure the accurate CSI feedback information at the gNB side, high-resolution quantization increases the overhead of the feedback, which degrades overall system-level performance. But low-resolution quantization (with corresponding lower number of overhead bits) may introduce larger quantization error, which negatively affects the performance of recovered channel feedback, or CSI. Thus, there is a trade-off between quality and overhead. This CSI quantization problem may be considered a CSI compression problem with respect to maximizing the CSI compression with minimal CSI feedback overhead, while also maintaining good CSI feedback quality.

In some example embodiments, there is provided a ML model, such as a neural network (e.g., an auto encoder, variational auto encoder, a binary variational CSI coder, and/or the like) based coder and decoder system.

In some example embodiments, the ML model may be implemented as a binary variational (biv) CSI coding system, which may provide CSI compression based in part on variational auto encoder (VAE) technology.

In some example embodiments, the binary variational (biv) CSI coding system may use a binary representation of a latent variable to represent the CSI coding. And, the latent variable may be modeled as a Bernoulli distribution.

Alternatively, or additionally, the binary variational (biv) CSI coding system may use the priori probability of the latent variable that is modeled with a binomial distribution and/or its approximation. The priori probability refers to a likelihood of an event occurring when there is a finite amount of outcomes and each is equally likely to occur.

Alternatively, or additionally, a binary re-parameterization technique may be applied in the binary variational (biv) CSI coding system to yield binary samples for the latent variable.

In accordance with some example embodiments, an input of CSI (e.g., channel gains or other CSI data) may be represented as binary CSI coding using a ML learning model (e.g., a neural network encoder, such the biv CSI coding system, although other types of ML models may be implemented as well). The dimensionality of the binary CSI coding may be a parameter for the CSI compression of the binary CSI coding. In other words, the amount of compression provided by the ML model based encoder ("ML encoder") to the CSI binary coding may be varied (or, e.g., set) to provide a given amount of compression to the binary CSI coding. In accordance with some example embodiments, a ML model based decoder ("ML decoder") may generate reconstructed CSI (e.g., channel gain and/or the like). For example, both the encoder and decoder may, as noted above, be implemented with ML models (e.g., neural networks, such as an auto encoder, variational auto encoder (VAE) the binary variational (biv) CSI coding and/or the like).

In the case of a VAE, such as the binary variational (biv) CSI coding system for example, the ML models may be trained and once trained, the ML model encoder may be deployed to the UE such as 102, while the ML model decoder may be deployed to the gNB, such as 110. Based on the UE's estimates of CSI such as channel gains, the UE may generate binary CSI codes using the trained ML model. The binary CSI codes (having limited dimension) may be sent back to gNB as CSI feedback. At the gNB side, the trained ML model decoder is applied to generate the re-constructed CSI information such as channel gains, so the gNB can obtain the CSI from the CSI feedback.

BIV CSI Coding

FIG. 2 depicts an example block diagram of a ML model based coding system 200 that encodes CSI into a latent space of lower dimensionality to provide compression and performs a binary sampling of the CSI before sending binary CSI coding to the gNB via an uplink channel, in accordance with some example embodiments. The "binary CSI coding" refers to a binary sampling, which corresponds to a binary representation of the compressed CSI. In the example of FIG. 2, the ML model based coding system 200 is also referred to herein as a binary variational (biv) CSI coding system.

At FIG. 2, the biv CSI coding system 200 is used to encode the CSI feedback sent by the UE 102 to the gNB 110. The coding system 200 includes an encoder 202, binary sampling 204, and a decoder 206. For example, the UE 102 may include the encoder 202 and the binary sampling 204, and the gNB 110 may include the decoder 206. The encoder and decoder are each implemented using machine learning, such as a neural network, which may include multiple layers of fully connected layers, convolutional neural network layers, and/or other layers/blocks. In some example embodiments, the neural network is based on a variational auto encoder (VAE) that has been reconfigured as disclosed herein to provide the binary variational (biv) CSI coder. For example, an AI engine on a processor chip at the UE may be configured to provide the encoder 202 comprised as a neural network as shown in the example of FIG. 1 at 104. Likewise, an AI engine on a processor chip at the gNB may be configured to provide the decoder 206 comprised as a neural network as shown in the example of FIG. 1 at 114. The binary sampling 204 may be comprised in an AI engine or other types of processors as well. Although some of the example refers to a biv CSI coder at 200, other types of ML models (e.g., neural networks and/or the like) may be used as well.

In the example of FIG. 2, the system 200 may be considered to have two operating phases, a training phase and a predicting (or operational) phase. The first phase is a training phase used to train the two neural networks of the encoder 202 and the decoder 206.

During the training phase, the encoder 202 may take at least one input x 210A, which in this example is a data sample of CSI, such as channel gain. This CSI channel gain may be in the form of a multi-dimension tensor. An example is a real-value tensor of dimension of (e.g., nSubband, nTx, nRx, 2), where nSubband is the number of frequency subbands or subcarriers, nTx is the number of transmit (Tx) antenna ports, nRx is the number of receive (Rx) antenna ports, and 2 indicates the real and imaginary part of one complex value (e.g., channel state as channel gain in a complex value).

The output 210B of the encoder 202 may be modelled as a log-likelihood ratio (LLR) vector $\lambda$ 210B, which is a log-likelihood ratio (LLR) value of a latent variable bit $z_j$. The latent variable represents a lower dimension hidden layer into which the encoder encodes the data sample 210A. In this way, the encoder can provide compression by encoding the input into a lower dimensional latent domain.

During the training phase, the binary sampling (or sampler) 204 may sample the log-likelihood ratio value vector $\lambda$ 210B (which is real valued) into a sequence of binary outputs 212A, which in this example is 0 or 1 in accordance with $z_j \in \{0, 1\}$. The detailed operation of the binary sampler is based on a novel binary re-parameterizing technique disclosed further below. In other words, the binary sampler output 212A is a binary CSI coding sequence (which represents the encoded CSI code) with each bit $z_j \in \{0, 1\}$. With the CSI feedback, the binary CSI code 212A is fed back to the gNB for decoding by the decoder 206. The decoder 206 uses the inputted CSI code z 212A to generate an output in the form of the re-constructed CSI channel gain $\hat{x}$ at 212B. During the training phase, the process may be repeated with a plurality of data samples presented at the input 210A and the same or similar data is presented at the output 212B until the neural networks at 202 and 206 converge to a minima or a maxima in accordance with a loss function or an objective function.

In the example of FIG. 2, after the ML models for the encoder 202 and decoder are trained, the predicting phase may be executed to encode one or more data samples 210A (which corresponds to the CSI) into a binary CSI code 212A, which is sent (e.g., passed through the CSI feedback channel, etc.) as a binary CSI code (which represents a lower dimensional, compressed binary coding of the CSI feedback presented at 210A) via the binary sampler 204 to the gNB, such that the gNB can decode the binary CSI code into the re-constructed CSI data 212B.

Binary Sampling

For the binary sampler 204, the approach in the biv CSI coding system 200 assumes that the latent variable is a binary distribution, such as a Bernoulli distribution. The encoder output 210B may use the LLR value, $\lambda$, (or, e.g., logit value) to represent a Bernoulli distribution z~Bernoulli (p, 1−p)

$$\lambda = \log\frac{p}{1-p}$$

where the log-likelihood ratio (LLR) value $\lambda$ represents the Bernoulli distribution.

However, a question is how to sample the Bernoulli distribution to yield binary z from the distribution $\lambda$. Direct sampling A may have problem in the gradient descent algorithm for neural network training because direct sampling is not easy to derive a gradient for a random variable. Instead, a binary re-parameterizing technique is derived to yield a binary z from $\lambda$ (which represents a real valued latent value in a lower dimensional distribution). Specifically, the binary sampler 204 may convert the LLR values from the output 210B of the encoder 202 into a binary vector. This operation may be defined as $$z = \text{sgn}(\lambda + \sigma\epsilon),$$

where $\lambda$ is the log-likelihood ratio (LLR) value vector from the encoder 202, $\sigma$ is a constant, $\epsilon$ is an independent gaussian random variable with zero mean and variance matrix as identity matrix $\epsilon \sim N(0, I)$, and sgn(•) is the sign function (or signum function).

The constant $\sigma$ may satisfy the equation $$Pr(\lambda + \sigma\epsilon \geq 0) = Q\left(\frac{\lambda}{\sigma}\right) = Pr(z = 1)$$

where Pr(•) represents probability, Q(•) is the Q-function, or the tail distribution of the standard normal distribution, as $$Q(x) = \frac{1}{\sqrt{2\pi}} \int_x^\infty \exp\left(-\frac{u^2}{2}\right) du.$$

Equivalently, the equation becomes the problem of using Q-function to approximate the sigmoid function, as $$Q\left(\frac{\lambda}{\sigma}\right) = \frac{e^\lambda}{1 + e^\lambda}$$

where a solution to this equation yields the value of σ≈1.7010.

During training of the system 200, the computation of the binary sampling 212A is an element of learning (via, e.g., backpropagation). For example, backpropagation may be used to compute a gradient descent with respect to weights, such that the output of the decoder 206 is compared to an actual data sample at 210A (e.g., CSI gains x as a desired output, while the reconstructed x at 212B as an actual output). During learning via backpropagation, the neural network is "tuned" as part of learning by at least adjusting connection weights of the neural network (e.g., at the ML model encoder 202 and the ML model decoder 206) to reduce the difference between the desired and actual outputs. Backpropagation relies on, as noted, a known, desired output for each input value in order to determine the loss function gradient.

Objective Function and Encoder

As noted, the ML models at 202 and 206 may be based in part on auto encoders, such as variational auto encoders (VAEs). With a VAE, a maximum likelihood algorithm is used that maximizes an objective function, such as the ELBO (evidence lower bound) for the posteriori probability (which refers to a revised probability that takes into account new available information) as follows:

$$\log p_\theta(x) \geq L_{\theta,\phi}(x) = E_{z \sim q_\phi(z|x)}[-\log q_\phi(z|x) + \log p_\theta(x|z) + \log p_\theta(z)]$$

With a single data point, the VAE ELBO, $\tilde{L}_{\theta,\phi}(x)$, may be approximated as the sum of three items as follows:

$$\tilde{L}_{\theta,\phi}(x) = \log p_\theta(x|z) + \log p_\theta(z) - \log q_\phi(z|x)$$

In this equation, the parameter $\phi$ is used to indicate the parameterized encoder 202, and $\theta$ indicates the parameterized decoder 206. The overall machine learning problem becomes an optimization problem, namely given one sample x (e.g., CSI data samples at 210A), find the parameters (θ, $\phi$) to maximize the objective (or loss) function $\tilde{L}_{\theta,\phi}(x)$. For the biv CSI coding, the data sample x is one CSI channel gain, which is usually a multi-dimension tensor. In the function, $\tilde{L}_{\theta,\phi}(x)$, the objective function includes a variational probability $q_\phi(z|x)$ for the machine learning encoder, a posteriori probability $p_\theta(x|z)$ for the machine learning decoder, and a priori probability $p_\theta(z)$ of the binary latent variable.

There are three items in the objective function, $\tilde{L}_{\theta,\phi}(x)$. These log-probabilities may be calculated in the neural network training phase as well as later during the predicting phase. The first two terms $p_\theta(x|z)$ and $p_\theta(z)$ are related to the decoder 206 with parameter θ and the binary data sampling 204, while the last term $q_\phi(z|x)$ defines the encoder 202, as the variational probability of binary latent variable z given one data sample x.

To define the encoder 202 with binary latent variable z in accordance with some example embodiments, the binary latent variable z is a vector. The latent variable z for one dimension of the vector z is defined as a Bernoulli distribution: z~Bernoulli(p, 1−p). Next, the logit value (LLR) λ is used as the output to represent the Bernoulli distribution as follows:

$$\lambda = \log \frac{p}{1-p}$$

And next, the encoder 202 is related to the calculation of the log variational probability of binary latent variable z given data sample x:

$$\log q_\phi(z|x) = \sum_j \lambda_j z_j - \log(1 + e^{\lambda_j}),$$

where $z_j \in \{0, 1\}$. The λ and z are vectors with dimension of J. The dimension J of the binary latent variable defines the size of the CSI coding and thus the amount of compression being provided by the encoder, so a smaller value of J indicates more compression and thus lower CSI feedback overhead. The calculation of the log variational probability is used as part of the objective function, which is used for model training for both encoder and decoder.

Latent Variable Distribution and the Decoder

As noted, the decoder 206 from the objective function above (e.g., VAE ELBO, $\tilde{L}_{\theta,\phi}(x)$) includes two terms, the posteriori probability $p_\theta(x|z)$ and the priori probability $p_\theta(z)$ of the binary latent variable z $$\log p_\theta(x|z) \sim -\frac{|x - \hat{x}|_{l_2}}{\sigma_x^2}$$

where $|\cdot|_{l_2}$ is the $l_2$ norm, and $$\sigma_x^2$$

is used to scale the MSE.

The priori distribution of the binary variable z with dimension j is a Bernoulli distribution per dimension, as $z_j$~Bernoulli(p, 1−p). The sum of z over its dimension, as $z=(z_1, \ldots, z_j)$, can be used where $z_j \in \{0, 1\}$. The sum of all $z_j$ is a binomial distribution, as $\Sigma_j z_j = k \sim B(J, p)$. When j is large (e.g., on the order of about 10 or more the binomial distribution may be approximated with a Gaussian distribution. Assuming $$p = \frac{1}{2}$$

for balanced binary variable $z_j$, and all $z_j$ are considered independent, the following may be provided:

$$Pr\left(\sum_j z_j = k\right) = B\left(J, \frac{1}{2}\right) \sim N\left(\frac{J}{2}, \frac{J}{4}\right),$$

so the log probability of the priori distribution of the binary variable z may be calculated as $$\log p_\theta(z) = \log p_\theta\left(\sum_j z_j = k\right) = -\frac{1}{2}\log 2\pi - \frac{1}{2}\log\frac{J}{4} - \frac{2}{J}\left(k - \frac{J}{2}\right)^2.$$

Summary of Biv-CSI Coding

To summarize with reference to FIG. 2, the ML model based coding system 200 (e.g., the binary variational (biv)-CSI coding system) may be summarized as follows. With the ML model (e.g., biv-CSI) encoder 202 and ML model (e.g., biv-CSI) decoder 206, the overall neural network training via backpropagation may use a stochastic gradient descent algorithm to solve the optimization problem: given sample x, find an encoder and a decoder to maximize an objective function (e.g., $\tilde{L}_{\theta,\phi}(x)$) as follows:

$$\tilde{L}_{\theta,\phi}(x) = \log p_\theta(x|z) + \log p_\theta(z) - \log q_\phi(z|x).$$

In some example embodiments, the encoder 202 may be implemented based at least in part on a variational auto encoder, such that the output of the encoder is used for the calculation of the log-variational probability based on the following equation:

$$\log q_\phi(z|x) = \sum_j \lambda_j z_j - \log(1 + e^{\lambda_j}), \text{ where } z_j \in \{0, 1\}.$$

The log-variational probability provides the log-probability of binary latent variable z given the input data sample x, based on the encoder 202 output values λ 210B, and the binary latent value z 212A.

In some example embodiments, the binary sampling may correspond to a binary sample of the output of the encoder 202. Specifically, the binary sampling 204 may receive as an input a log likelihood ratio (LLR) vector λ 210B and may convert the LLR values into a binary data, such as binary vector z 212A. This operation may be defined as $$z = \text{sgn}(\lambda + \sigma\epsilon),$$

where λ is the log-likelihood ratio (LLR) value vector from the encoder 202, σ is a constant (e.g., σ=1.7010 or another value), ε is an independent gaussian random variable with zero mean and variance matrix as identity matrix ε~N(0, I), and sgn(•) is the sign function (or signum function). The latent variable distribution of the binary vector z may be as follows:

$$\log p_\theta(z) = \log p_\theta\left(\sum_j z_j = k\right) = -\frac{1}{2}\log 2\pi - \frac{1}{2}\log\frac{J}{4} - \frac{2}{J}\left(k - \frac{J}{2}\right)^2.$$

The priori probability of the binary latent variable is calculated based on the binomial distribution of the sum of the binary latent variable over its dimension. The binomial distribution has parameter J as independent trials, which is equal to the dimension of the binary latent variable; and each trial probability of the binomial distribution is 0.5.

Figure 3:
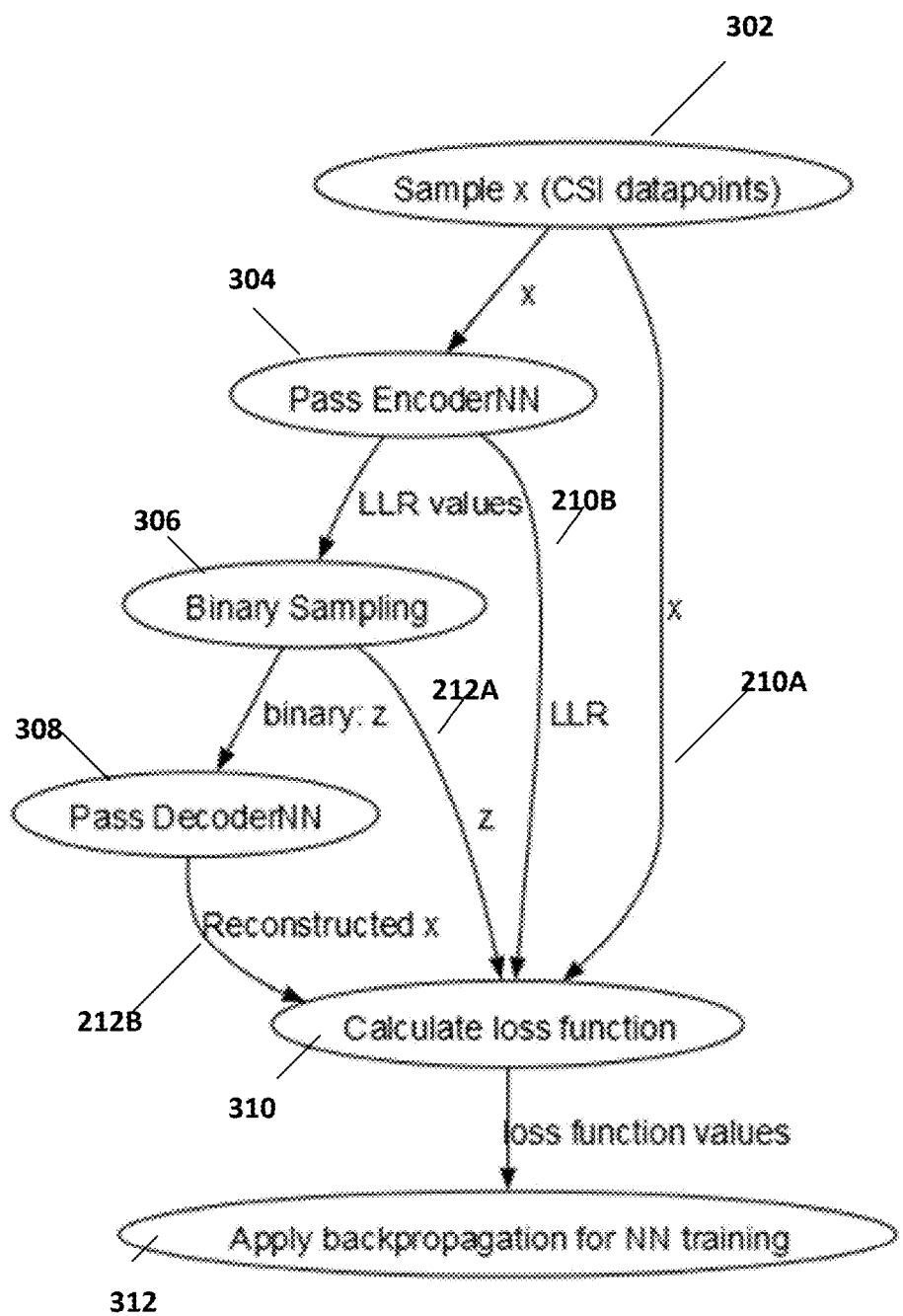
FIG. 3 depicts another example of training the ML model, in accordance with some example embodiments.

FIG. 3 depicts an example of a training phase for a machine learning based channel state information coding system, in accordance with some example embodiments.

At 302, one or more CSI data samples may be received and passed (e.g., provided as an input) at 304 to a ML model encoder, in accordance with some example embodiments. For example, one or more CSI data samples may be received at 210A by the encoder 202. To illustrate further, the UE may measure the downlink channel state information-reference signals (CSI-RS) to form the CSI data samples 210A, which are received by the encoder 202. At 304, the encoder may output LLR values, such as (LLR) vector λ 210B. As noted, the LLR vector λ 210B may be in the latent variable domain and represent the Bernoulli distribution of binary latent variable.

In accordance with some example embodiments, binary sampling may be used at 306 to re-parameterize the LLR values (which are provided or output by the encoder) into binary values, such as 0 and 1. For example, the binary sampler 204 may convert the LLR values (which represents a vector of Bernoulli distributed random variables from the output 210B of the encoder 202) into a binary coded CSI data 212A, such as binary data vector, using a sgn or signum function, which may be represented as follows:

$$z = \text{sgn}(\lambda + \sigma\epsilon).$$

At 308, the binary vector 212A is provided (e.g., as an input) to the decoder 206, which outputs 212B reconstructed values of the input CSI data, in accordance with some example embodiments. At 310, a loss function (or an objective function) may be calculated based on the reconstructed CSI data samples 212B, the initial CSI data samples 212A, LLR values λ 210B, and the binary CSI coded vector (or its values) 212A. As noted above, for a single data point, the loss function may be approximated, in accordance with some example embodiments, as the sum of three following three items $$\tilde{L}_{\theta,\phi}(x) = \log p_\theta(x|z) + \log p_\theta(z) - \log q_\phi(z|x).$$

With respect to the objective (or loss) function $\tilde{L}_{\theta,\phi}(x)$, the calculation of the function is based at least in part on (e.g., using as an input) the priori probability log $p_\theta(z)$, in accordance with some example embodiments. This step provides a priori probability of a given binary latent variable distribution so that the binary latent variable can provide a "rich" representation for any given data sample CSI x.

With respect to the objective (or loss) function $\tilde{L}_{\theta,\phi}(x)$, the calculation of the function is based on (e.g., using as an input) the log-variational probability log $q_\theta(z|x)$, in accordance with some example embodiments. This step provides a variational probability of the binary latent variable so that the encoder can be optimized to approach its optimal representation for data samples x.

At 312, the system 200 may learns based on backpropagation (e.g., using a maxima or a minima of the loss or objective function), in accordance with some example embodiments. When training is completed, the weights of the neural networks forming the encoder and decoder are then used to configure trained ML models for the encoder and decoder, which can then be used in a predicting phase. In other words, once the encoder 202 and decoder 206 are trained, the encoder 202 and decoder 206 can be applied to the UE and the gNB, respectively, to support the CSI feedback process during the predicting phase.

Figure 4:
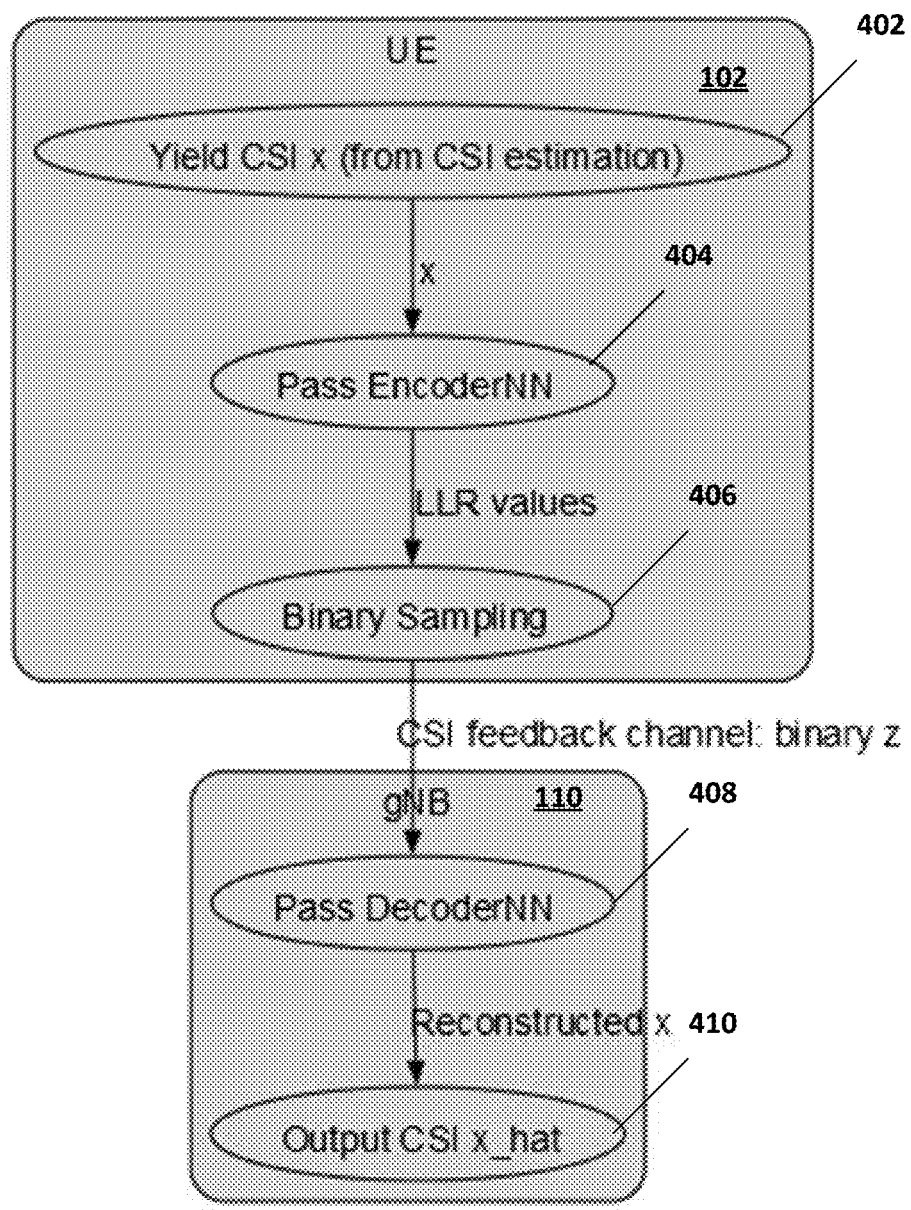
FIG. 4 depicts an example block diagram depicting the predicting phase of the ML model, in accordance with some example embodiments.

FIG. 4 depicts an example of a process for a predicting phase of the neural network based encoder and decoder, in accordance with some example embodiments.

The UE 102 may include an encoder based neural network trained as disclosed above with respect to FIG. 3, for example. When this is the case, the UE may provide (e.g., output, yield, etc.) at 402 one or more CSI estimates, such as the CSI measurements determined by the UE and provided as the value(s) x 210A to the encoder 202. For example, the UE may provide (to the ML model encoder) the CSI x 210A in the form of channel gains from its CSI measurement estimation.

At 404, the neural network encoder 202 may take the input value(s) and generate the LLR λ values 210B, which are then re-parameterized by the binary sampling 204, in accordance with some example embodiments. For example, the binary sampling may sample the real values of the LLR λ vector values and re-parametrize them as for example 0 or 1. This is similar to the above noted with respect to the data sampling 204 process, but the encoder and decoder are being executed for predicting rather than being trained via back-propagation, for example.

The output 212A of the binary sampling 204 may then be sent in a channel measurement reporting message to the gNB 110, which includes a neural network decoder 206, which was trained as noted above with respect to FIG. 3, for example. The output 212A (also at the output of 406) is the binary CSI coding that is sent in the CSI feedback channel. The neural network decoder 206 in the gNB 110 receives the binary CSI codes 212A, processes those received binary CSI codes, and then outputs 212B a reconstruction of the CSI or CSI channel gains, as reconstructed CSI x 212B at the output of 410, for example.

Figure 5:
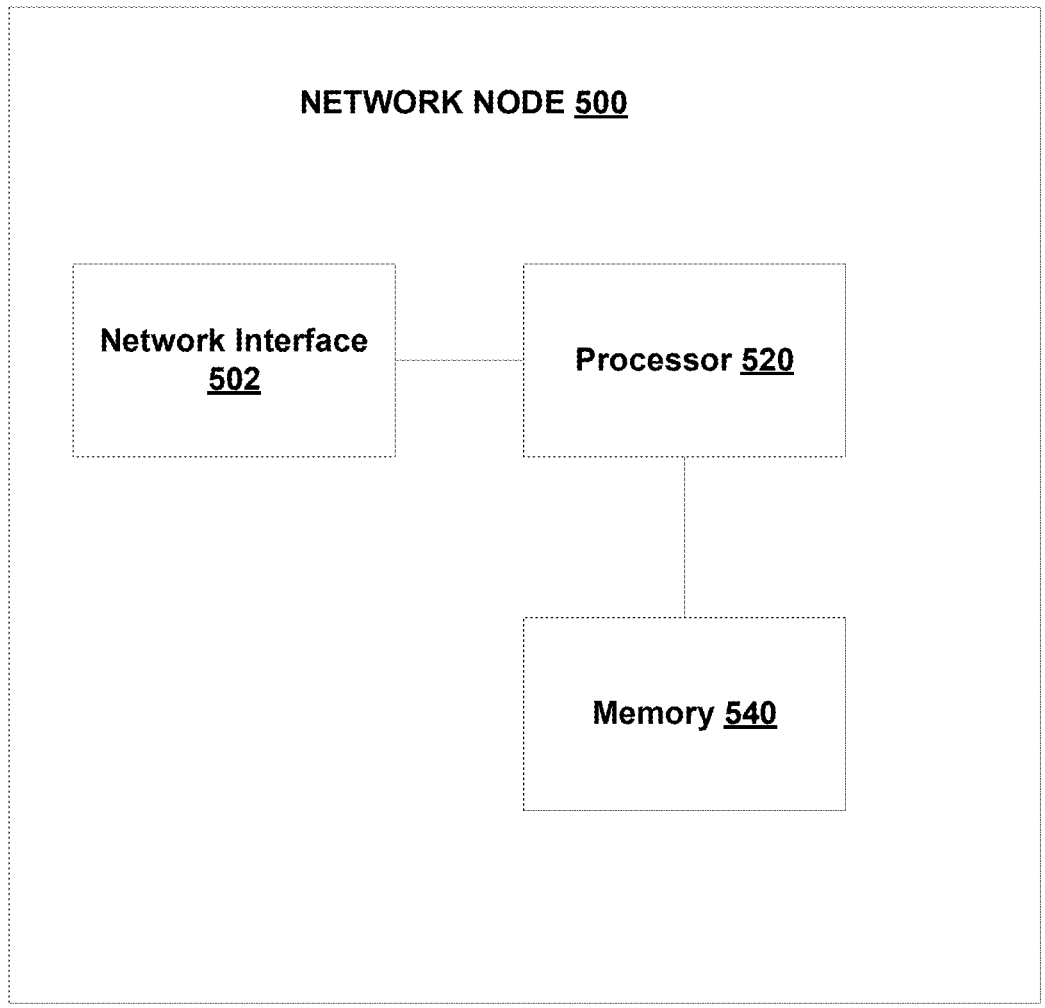
FIG. 5 depicts an example of a network node, in accordance with some example embodiments.

FIG. 5 depicts a block diagram of a network node 500, in accordance with some example embodiments. The network node 500 may comprise or be comprised in one or more network side nodes or functions (e.g., gNB, eNB, DU, TRPs, and/or the like).

The network node 500 may include a network interface 502, a processor 520, and a memory 504, in accordance with some example embodiments. The network interface 502 may include wired and/or wireless transceivers to enable access other nodes including base stations, other network nodes, the Internet, other networks, and/or other nodes. The memory 504 may comprise volatile and/or non-volatile memory including program code, which when executed by at least one processor 520 provides, among other things, the processes disclosed herein with respect to the base station, such as the gNB. For example, the gNB may include a trained machine learning decoder, which receives a measurement report provided by a user equipment, wherein the measurement report includes a binary coding value representation of a channel state information, and the machine learning decoder may generate reconstructed channel state information, wherein the generating is based in part on the binary coding value representation.

Figure 6:
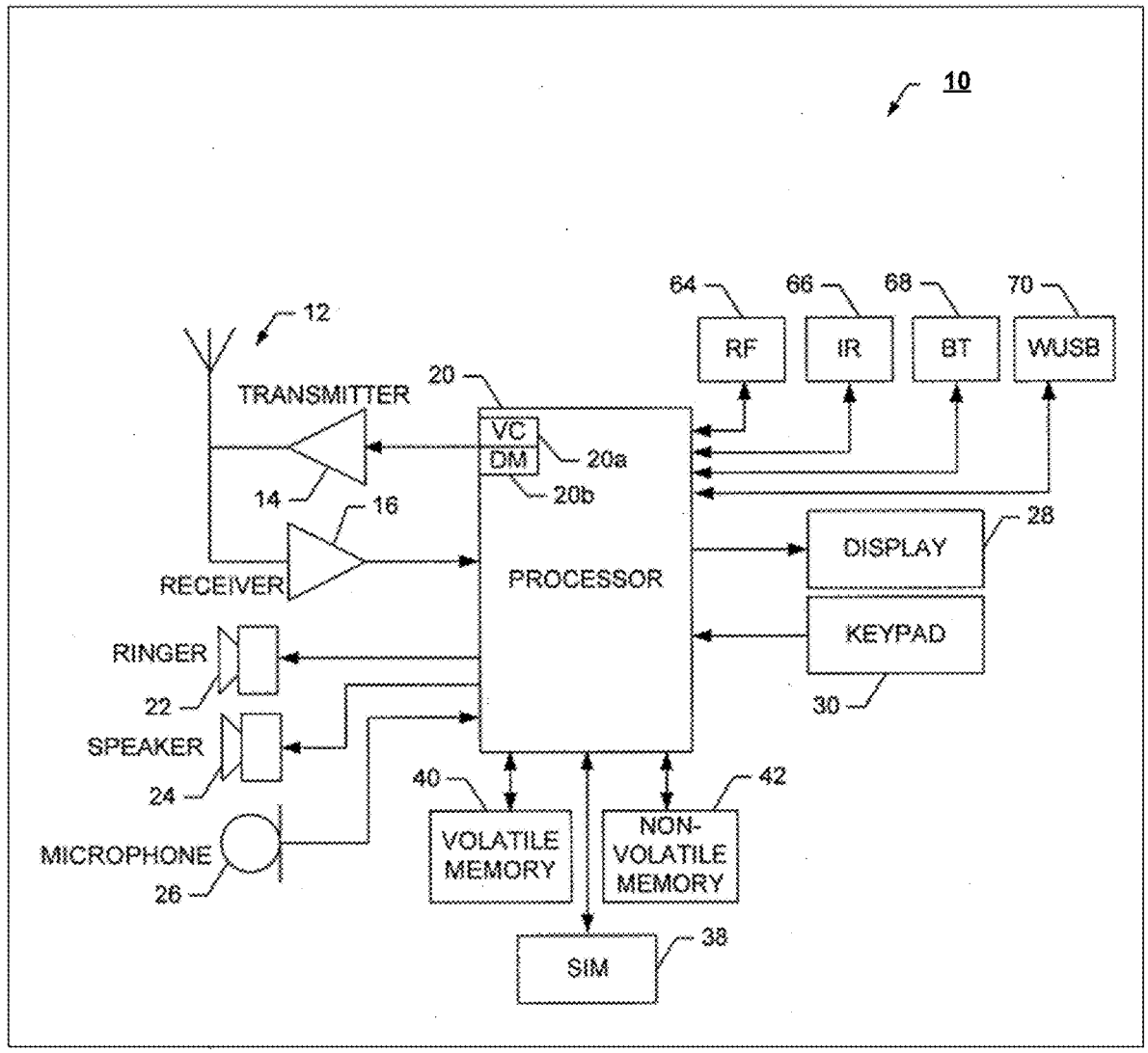
FIG. 6 depicts an example of an apparatus, in accordance with some example embodiments.

FIG. 6 illustrates a block diagram of an apparatus 10, in accordance with some example embodiments. The apparatus 10 may comprise or be comprised in a user equipment, such as user equipment 204. In general, the various embodiments of the user equipment 204 can include cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions, in addition for vehicles such as autos and/or truck and aerial vehicles such as manned or unmanned aerial vehicle and as well as portable units or terminals that incorporate combinations of such functions. The user equipment may comprise or be comprised in an IoT device, an Industrial IoT (IIoT) device, and/or the like. In the case of an IoT device or IToT device, the UE may be configured to operate with less resources (in terms of for example power, processing speed, memory, and the like) when compared to a smartphone, for example.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, sixth-generation (6G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, U-SIM, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE (e.g., one or more of the processes, calculations, and the like disclosed herein including, for example, providing, to a trained machine learning encoder comprised at a user equipment, channel state information, wherein user equipment further comprises a binary sampler; generating, by the binary sampler, a binary coding value representation the channel state information, wherein the binary sampler converts a latent variable representation of the channel state information into the binary coding value to provide compression to the channel state information before transmission via a feedback channel; and sending, by the user equipment, a measurement report to a base station, wherein the measurement report includes the binary coding value representation of the channel state information to enable the base station to decode, using a machine learning decoder, the representation in order to reconstruct the channel state information.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiments, the application logic, software or an instruction set is maintained on any one of various conventional computer-readable media. In the context of this document, a "computer-readable storage medium" may be any non-transitory media that can contain, store, communicate, propagate or transport the instructions for use by or in connection with an instruction execution system, apparatus, or device, such as a computer or data processor circuitry; computer-readable medium may comprise a non-transitory computer-readable storage medium that may be any media that can contain or store the instructions for use by or in connection with an instruction execution system, apparatus, or device, such as a computer.

Figure 7A:
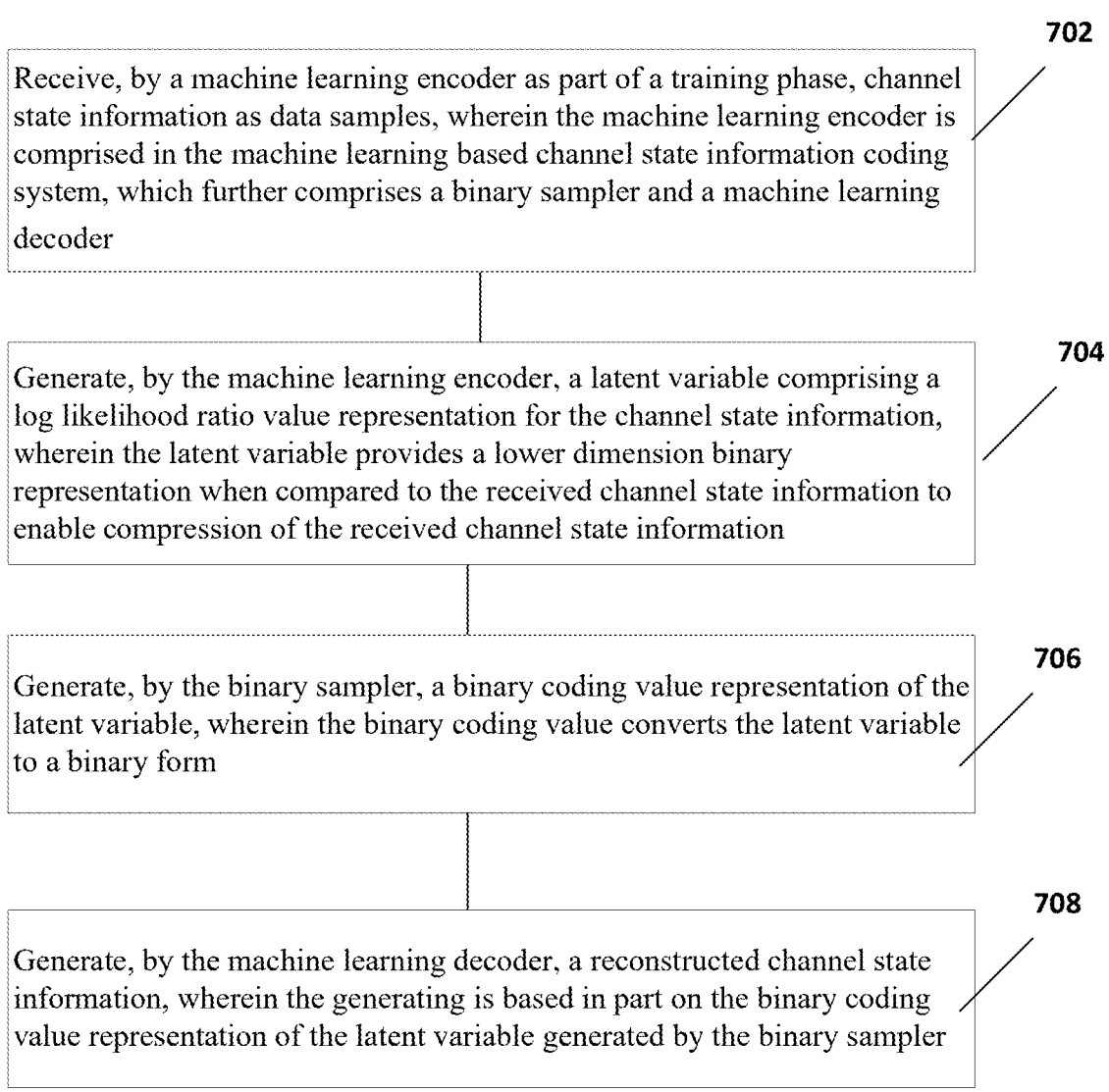

FIG. 7A depicts an example process, in accordance with some example embodiments.

At 702, a machine learning encoder may receive (during a training phase) channel state information as data samples, in accordance with some example embodiments. The machine learning encoder may be comprised in the machine learning based channel state information coding system, which may further comprise a binary sampler and a machine learning decoder. At 704, the machine learning encode may generate a latent variable comprising a log likelihood ratio value representation for the channel state information, in accordance with some example embodiments. The latent variable may provide a lower dimension binary representation when compared to the received channel state information to enable compression of the received channel state information. At 706, a binary sampler may generate a binary coding value representation of the latent variable, in accordance with some example embodiments. The binary coding value may convert the latent variable to a binary form. At 708, the machine learning decoder may generate reconstructed channel state information, in accordance with some example embodiments. The generating may be based in part on the binary coding value representation of the latent variable generated by the binary sampler.

FIG. 7B depicts an example process, in accordance with some example embodiments.

At 712, a trained machine learning encoder (which may be comprised in a user equipment) may be provided with (e.g., receive) channel state information, in accordance with some example embodiments. The user equipment may further comprise a binary sampler. At 714, the binary sampler may generate a binary coding value representation of the channel state information, in accordance with some example embodiments. The binary sampler may convert a latent variable representation of the channel state information into the binary coding value to provide compression to the channel state information before transmission via a feedback channel. At 716, the user equipment may send a measurement report to a base station, such that the measurement report includes the binary coding value representation of the channel state information to enable the base station to decode the representation, using a machine learning decoder, in order to reconstruct the channel state information, in accordance with some example embodiments. The measurement report may be triggered by a request from the network for periodic or aperiodic reporting.

FIG. 7C depicts an example process, in accordance with some example embodiments.

At 722, a trained machine learning decoder may receive a measurement report provided by a user equipment, wherein the measurement report includes a binary coding value representation of a channel state information in accordance with some example embodiments. At 724, the machine learning decoder may generate reconstructed channel state information, wherein the generating is based in part on the binary coding value representation.

Without in any way limiting the scope, interpretation, or application of the claims appearing below, a technical effect of one or more of the example embodiments disclosed herein may include a framework within the NR for beam prediction in spatial domain as well as the corresponding configuration and reporting.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine learning. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method for predicting using a machine learning based channel state information coding system, comprising:
providing, to a machine learning encoder comprised at a user equipment, channel state information to generate a latent variable representation of the channel state information comprising a log-likelihood ratio vector of log-likelihood ratio values;
performing binary sampling, by a binary sampler comprised at the user equipment, to generate a random binary vector representing the channel state information from the log-likelihood ratio vector wherein the binary sampling converts the log-likelihood ratio vector into the random binary vector based on a sign function that uses a log-likelihood ratio value and a random variable as input; and
sending, by the user equipment, a measurement report to a base station, wherein the measurement report includes the random binary vector representing the channel state information to enable the base station to decode the random binary vector, using a machine learning decoder, in order to reconstruct the channel state information.

2. The method of claim 1, wherein the machine learning decoder of the base station is comprised in the machine learning based channel state information coding system.

3. The method of claim 1, wherein the machine learning encoder and the machine learning decoder are trained using an objective function, wherein the objective function includes a variational probability for the machine learning encoder, a posteriori probability for the machine learning decoder, and a priori probability of the random binary vector.

4. The method of claim 3, wherein the objective function comprises a sum of the posteriori probability for the machine learning decoder and the priori probability of the random binary vector less the variational probability for the machine learning encoder.

5. The method of claim 3, wherein the machine learning encoder and the machine learning decoder are trained using backpropagation and the objective function to determine one or more weights of the machine learning encoder and the machine learning decoder, and wherein the objective function uses at least one input comprising the random binary vector.

6. The method of claim 3, wherein the machine learning encoder and the machine learning decoder are comprised in a variational auto encoder trained with the objective function.

7. The method of claim 3, wherein the objective function may be represented by the following equation:

$$\tilde{L}_{\theta,\phi}(x) = \log p_\theta(x|z) + \log p_\theta(z) - \log q_\phi(z|x),$$

wherein $\phi$ indicates the machine learning encoder, $\theta$ indicates the machine learning decoder, $\tilde{L}_{\theta,\phi}(x)$ represents the objective function, $p_\theta(x|z)$ is the posteriori probability for the machine learning decoder, $q_\phi(z|x)$ is the variational probability for the machine learning encoder, and $p_\theta(z)$ is the priori probability of the random binary vector.

8. The method of claim 1, wherein the machine learning encoder is comprised in an artificial intelligence engine at the user equipment.

9. The method of claim 1, wherein the random variable comprises a Gaussian random variable.

10. The method of claim 1, wherein the log-likelihood ratio values output by the machine learning encoder represent a Bernoulli distribution sampled by the binary sampler.

11. An apparatus comprising user equipment, the apparatus comprising:
at least one processor; and
at least one memory including computer program code, the at least one memory and the computer program code configured to, with the at least one processor, cause the apparatus to at least:
provide, to a machine learning encoder comprised at the user equipment, channel state information to generate a latent variable representation of the channel state information comprising a log-likelihood ratio vector of log-likelihood ratio values;
perform binary sampling, by a binary sampler comprised at the user equipment, to generate a random binary vector representing the channel state information from the log-likelihood ratio vector, wherein the binary sampler converts the log-likelihood ratio vector into the random binary vector based on a sign function that uses a log-likelihood ratio value and a random variable as input; and
send a measurement report to a base station, wherein the measurement report includes the random binary vector representing the channel state information to enable the base station to decode the random binary vector, using a machine learning decoder, in order to reconstruct the channel state information.

12. The apparatus of claim 11, wherein the machine learning encoder and the machine learning decoder are trained using an objective function, wherein the objective function includes a variational probability for the machine learning encoder, a posteriori probability for the machine learning decoder, and a priori probability of the random binary vector.

13. The apparatus of claim 12, wherein the objective function comprises a sum of the posteriori probability for the machine learning decoder and the priori probability of the random binary vector less the variational probability for the machine learning encoder.

14. The apparatus of claim 12, wherein the machine learning encoder and the machine learning decoder are trained using backpropagation and the objective function to determine one or more weights of the machine learning encoder and the machine learning decoder, and wherein the objective function uses at least one input comprising the random binary vector.

15. The apparatus of claim 12, wherein the machine learning encoder and the machine learning decoder are comprised in a variational auto encoder trained with the objective function.

16. The apparatus of claim 12, wherein the objective function may be represented by the following equation:

$$\tilde{L}_{\theta,\phi}(x) = \log p_\theta(x|z) + \log p_\theta(z) - \log q_\phi(z|x),$$

wherein $\phi$ indicates the machine learning encoder, $\theta$ indicates the machine learning decoder, $\tilde{L}_{\theta,\phi}(x)$ represents the objective function, $p_\theta(x|z)$ is the posteriori probability for the machine learning decoder, $q_\phi(z|x)$ is the variational probability for the machine learning encoder, and $p_\theta(z)$ is the priori probability of the random binary vector.

17. The apparatus of claim 11, wherein the machine learning encoder is comprised in an artificial intelligence engine at the user equipment.

18. The apparatus of claim 11, wherein the random variable comprises a Gaussian random variable.

19. The apparatus of claim 11, wherein the log-likelihood ratio values output by the machine learning encoder represent a Bernoulli distribution sampled by the binary sampler.

* * * * *